US012657893B2

(12) United States Patent
Ji et al.

(10) Patent No.: US 12,657,893 B2
(45) Date of Patent: Jun. 16, 2026

(54) MODEL TRAINING METHOD AND APPARATUS, TEXT IMAGE PROCESSING METHOD, DEVICE AND MEDIUM

(71) Applicants:Beijing BOE Technology Development Co., Ltd., Beijing (CN); BOE Technology Group Co., Ltd., Beijing (CN)

(72) Inventors: Chao Ji, Beijing (CN); Boran Jiang, Beijing (CN); Ge Ou, Beijing (CN); Shuqi Wei, Beijing (CN); Pengfei Zhang, Beijing (CN); Chuqian Zhong, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 335 days.

(21) Appl. No.: 18/279,857

(22) PCT Filed: Nov. 24, 2022

(86) PCT No.: PCT/CN2022/133939
§ 371 (c)(1),
(2) Date: Aug. 31, 2023

(87) PCT Pub. No.: WO2024/108472
PCT Pub. Date: May 30, 2024

(65) Prior Publication Data
US 2025/0037443 A1    Jan. 30, 2025

(51) Int. Cl.
*G06V 10/80* (2022.01)
*G06T 5/60* (2024.01)
(Continued)

(52) U.S. Cl.
CPC .............. *G06V 10/806* (2022.01); *G06T 5/60* (2024.01); *G06V 10/7715* (2022.01);
(Continued)

(58) Field of Classification Search
CPC ............. G06V 10/806; G06V 10/7715; G06V 10/774; G06V 10/82; G06V 30/19;
(Continued)

(56) References Cited

U.S. PATENT DOCUMENTS

| 2020/0013380 A1* | 1/2020 | Kakoyiannis | ........... G06F 16/61 |
| 2020/0151503 A1* | 5/2020 | Wang | .................... G06F 18/214 |

(Continued)

FOREIGN PATENT DOCUMENTS

| CN | 111401375 A | 7/2020 |
| CN | 113536003 A | 10/2021 |

(Continued)

OTHER PUBLICATIONS

Cheng Q, Wen K, Gu X. Vision-language matching for text-to-image synthesis via generative adversarial networks. IEEE Transactions on Multimedia. Oct. 26, 2022;25:7062-75.*

*Primary Examiner* — Xuemei G Chen
(74) *Attorney, Agent, or Firm* — Ling Wu; Stephen Yang; Ling and Yang Intellectual Property

(57) ABSTRACT

A model training method includes: acquiring a sample set including a plurality of sample groups; the sample group includes an original image sample and original text samples; performing mask processing on the original image sample and the original text samples to generate a mask image sample and mask text samples; using the mask image sample and the mask text samples to perform adversarial training on a generator and a discriminator to obtain a target model; the generator includes a feature extraction network and an output network, the feature extraction network is used to (Continued)

perform feature extraction after information fusion of an input image and an input text of the generator.

19 Claims, 8 Drawing Sheets

(51) Int. Cl.
    *G06V 10/77*       (2022.01)
    *G06V 10/774*    (2022.01)
    *G06V 10/82*     (2022.01)

(52) U.S. Cl.
    CPC ............ *G06V 10/774* (2022.01); *G06V 10/82* (2022.01); *G06T 2207/20081* (2013.01); *G06T 2207/20084* (2013.01)

(58) Field of Classification Search
    CPC ............ G06T 5/60; G06T 2207/20081; G06T 2207/20084; G06F 18/00; G06F 40/10; G06N 3/08; G10L 15/02
    See application file for complete search history.

(56)           References Cited

U.S. PATENT DOCUMENTS

| | | | |
|---|---|---|---|
| 2022/0005235 A1* | 1/2022 | Gou | H04N 21/8153 |
| 2022/0208155 A1* | 6/2022 | Ivers | G10H 1/368 |
| 2023/0005178 A1* | 1/2023 | Liu | G06V 30/274 |
| 2023/0068103 A1* | 3/2023 | Zhou | G06F 16/583 |
| 2023/0071456 A1* | 3/2023 | Rakshit | G06F 3/04842 |
| 2023/0075233 A1* | 3/2023 | Riazi | G06V 10/82 |
| 2023/0081171 A1* | 3/2023 | Zhang | G06T 11/00 382/157 |
| 2023/0089566 A1* | 3/2023 | Shao | G06V 20/30 386/278 |
| 2023/0153606 A1* | 5/2023 | Min | G06N 3/08 706/25 |
| 2023/0186098 A1* | 6/2023 | Chang | G06N 3/0464 706/25 |
| 2023/0215162 A1* | 7/2023 | Kim | G06V 10/82 382/157 |
| 2023/0230198 A1* | 7/2023 | Zhang | G06N 3/08 382/276 |
| 2023/0386168 A1 | 11/2023 | Sun et al. | |
| 2024/0135599 A1* | 4/2024 | Wang | G06T 11/00 |
| 2024/0161365 A1* | 5/2024 | Mene | G06T 5/00 |
| 2024/0386621 A1* | 11/2024 | Zhang | G06V 10/761 |
| 2025/0069280 A1* | 2/2025 | Zhao | G06F 40/279 |

FOREIGN PATENT DOCUMENTS

| | | |
|---|---|---|
| CN | 114463586 A | 5/2022 |
| CN | 114677556 A | 6/2022 |
| CN | 114942984 A | 8/2022 |
| CN | 114972823 A | 8/2022 |
| CN | 115035538 A | 9/2022 |
| WO | 2021254499 A1 | 12/2021 |

* cited by examiner

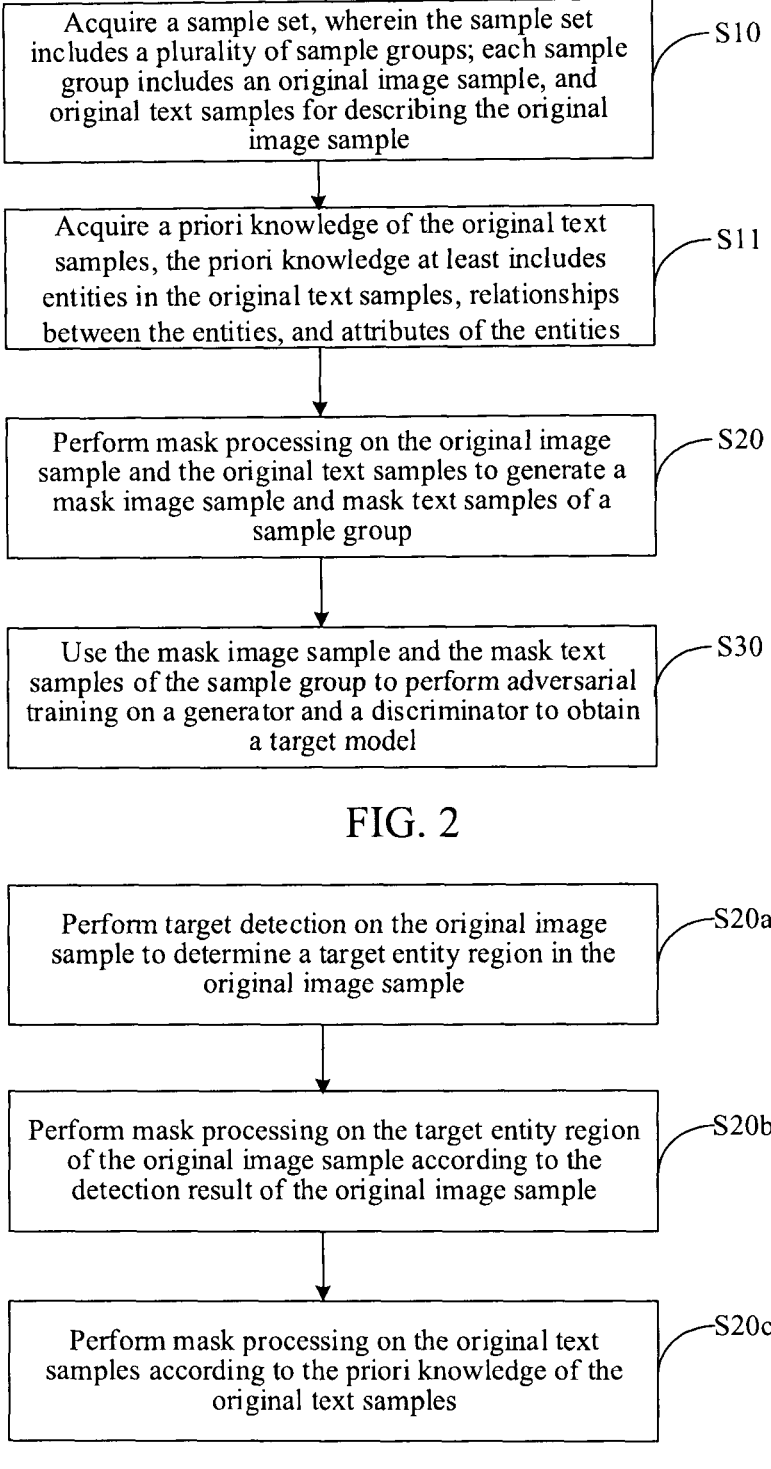

Acquire a sample set, wherein the sample set includes a plurality of sample groups; each sample group includes an original image sample, and original text samples for describing the original image sample ⟋S10

Acquire a priori knowledge of the original text samples, the priori knowledge at least includes entities in the original text samples, relationships between the entities, and attributes of the entities ⟋S11

Perform mask processing on the original image sample and the original text samples to generate a mask image sample and mask text samples of a sample group ⟋S20

Use the mask image sample and the mask text samples of the sample group to perform adversarial training on a generator and a discriminator to obtain a target model ⟋S30

FIG. 2

Perform target detection on the original image sample to determine a target entity region in the original image sample ⟋S20a Perform mask processing on the target entity region of the original image sample according to the detection result of the original image sample ⟋S20b Perform mask processing on the original text samples according to the priori knowledge of the original text samples ⟋S20c

FIG. 3

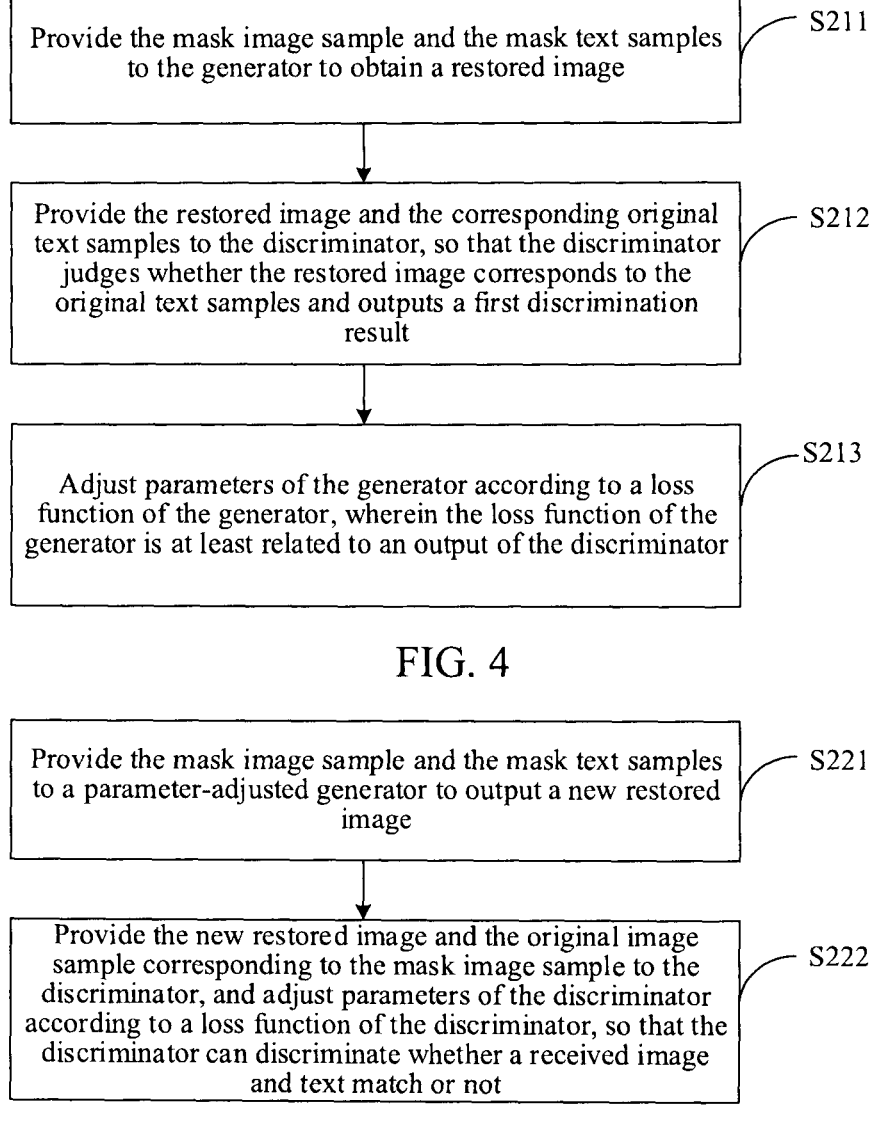

Provide the mask image sample and the mask text samples to the generator to obtain a restored image        — S211

Provide the restored image and the corresponding original text samples to the discriminator, so that the discriminator judges whether the restored image corresponds to the original text samples and outputs a first discrimination result        — S212

Adjust parameters of the generator according to a loss function of the generator, wherein the loss function of the generator is at least related to an output of the discriminator        — S213

FIG. 4

Provide the mask image sample and the mask text samples to a parameter-adjusted generator to output a new restored image        — S221

Provide the new restored image and the original image sample corresponding to the mask image sample to the discriminator, and adjust parameters of the discriminator according to a loss function of the discriminator, so that the discriminator can discriminate whether a received image and text match or not        — S222

FIG. 5

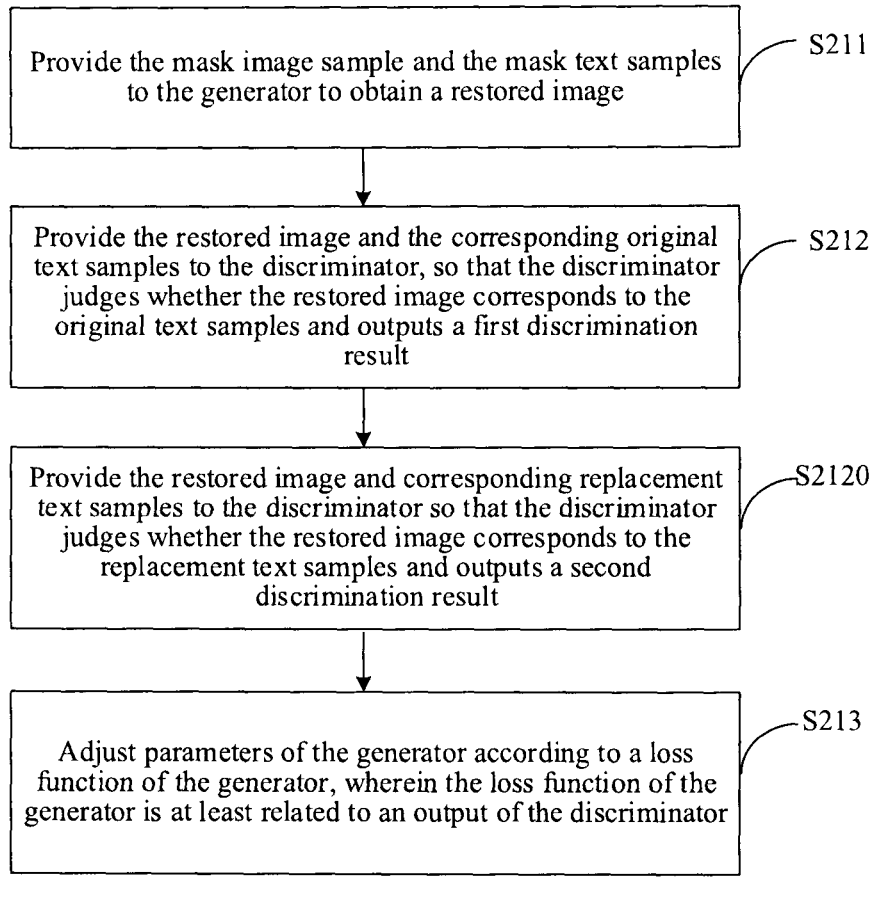

Provide the mask image sample and the mask text samples to the generator to obtain a restored image ⟋ S211

Provide the restored image and the corresponding original text samples to the discriminator, so that the discriminator judges whether the restored image corresponds to the original text samples and outputs a first discrimination result ⟋ S212

Provide the restored image and corresponding replacement text samples to the discriminator so that the discriminator judges whether the restored image corresponds to the replacement text samples and outputs a second discrimination result ⟋ S2120

Adjust parameters of the generator according to a loss function of the generator, wherein the loss function of the generator is at least related to an output of the discriminator ⟋ S213

FIG. 6

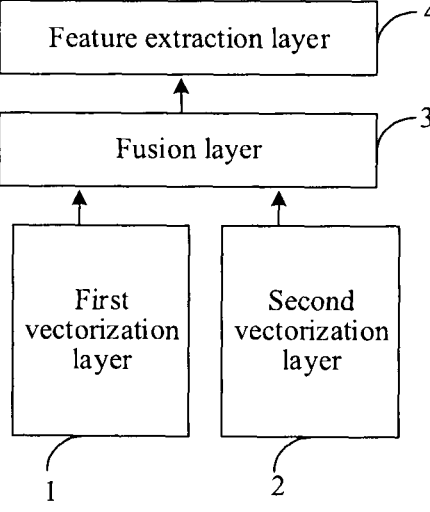

Feature extraction layer ⟋ 4

Fusion layer ⟋ 3

First vectorization layer ⟋ 1

Second vectorization layer ⟋ 2

FIG. 7

Acquire a sample set, wherein the sample set includes a plurality of sample groups; each sample group includes an original image sample, and original text samples for describing the original image sample — S10

Perform mask processing on the original image sample and the original text samples to generate a mask image sample and mask text samples of a sample group — S20

Use the mask image sample and the mask text samples of the sample group to perform adversarial training on a generator and a discriminator to obtain a target model — S30

Obtain a target sample set corresponding to a target training task — S40

Train the fine-tuning model according to the target sample set — S50

FIG. 10

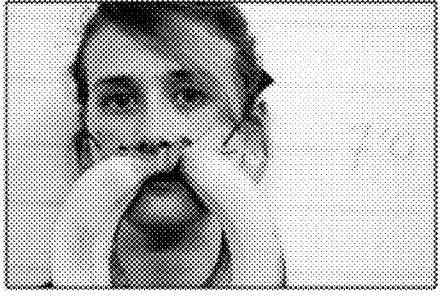

FIG. 11

MODEL TRAINING METHOD AND APPARATUS, TEXT IMAGE PROCESSING METHOD, DEVICE AND MEDIUM

CROSS-REFERENCE TO RELATED APPLICATION

This application is a national stage application of PCT Application No. PCT/CN2022/133939, which is filed on Nov. 24, 2022, and entitled "Model Training Method and Apparatus, Text Image Processing Method, Device and Medium", the content of which should be regarded as being incorporated herein by reference.

TECHNICAL FIELD

The present disclosure relates to the field of display technologies, and particularly, to a model training method and apparatus, a text image processing method, a computer device and a computer-readable storage medium.

BACKGROUND

Natural Language Processing (NLP) is an important direction in the field of computer science and artificial intelligence. Natural language processing studies various theories and methods that can realize effective communication between human and computer in natural language. With the development of artificial intelligence (AI) algorithm and AI chip and other hardware technologies, intelligent devices have been widely used in daily life, such as smart home voice control system, smart speaker, smart conference systems meeting record generation, intelligent question answering system and so on.

SUMMARY

The present disclosure presents a model training method and apparatus, a text image processing method, a computer device and a computer-readable storage medium.

The present disclosure provides a model training method, including:

acquiring a sample set including a plurality of sample groups; each sample group includes an original image sample and original text samples for describing the original image sample;

performing mask processing on the original image sample and the original text samples to generate a mask image sample and mask text samples of the sample group;

using the mask image sample and the mask text samples of the sample group to perform adversarial training on a generator and a discriminator to obtain a target model.

The generator includes a feature extraction network and an output network, the feature extraction network is used to perform feature extraction after information fusion of an input image and an input text of the generator; the output network is used to generate a restored image according to an output result of the feature extraction network.

The discriminator is used to judge whether the restored image is consistent with the original text samples.

The target model at least includes a feature extraction network in the trained generator.

In some embodiments, the adversarial training includes alternately repeated generator training act and discriminator training act.

The generator training act includes:

providing the mask image sample and the mask text samples to the generator to obtain a restored image;

providing the restored image and the corresponding original text samples to the discriminator for the discriminator to judge whether the restored image corresponds to the original text samples and outputting a first discrimination result;

adjusting parameters of the generator according to a loss function of the generator, wherein the loss function of the generator is at least related to an output of the discriminator.

The discriminator training act includes:

providing the mask image sample and the mask text samples to a parameter-adjusted generator to output a new restored image;

providing the new restored image and the original image sample corresponding to the mask image sample to the discriminator, and adjusting parameters of the discriminator according to a loss function of the discriminator, so that the discriminator can discriminate whether the received image and the text match or not.

In some embodiments, the generator training act further includes:

providing the restored image and corresponding replacement text samples to the discriminator so that the discriminator judges whether the restored image corresponds to the replacement text samples and outputs a second discrimination result;

The replacement text samples are obtained by replacing at least one of an entity, an entity relationship and an entity attribute in the original text samples.

In some embodiments, the difference between the number of the replacement text samples and the number of the original text samples is less than or equal to a preset threshold.

In some embodiments, the method further includes: acquiring a priori knowledge of the original text samples, the priori knowledge at least includes: entities in the original text samples, relationships between the entities, attributes of the entities.

Performing mask processing on the original image sample and the original text samples, includes:

performing target detection on the original image sample to determine a target entity region in the original image sample;

performing mask processing on the target entity region of the original image sample according to the detection result of the original image sample;

performing mask processing on the original text samples according to the priori knowledge of the original text samples.

In some embodiments, the feature extraction network includes:

a first vectorization layer used for vectorizing the input image of the generator to obtain an image vector;

a second vectorization layer used for vectorizing the input text of the generator to obtain a text vector of the input text;

a fusion layer for fusing the image vector and the text vector to obtain a fusion vector;

a feature extraction layer for performing feature extraction on the fusion vector.

In some embodiments, the feature extraction layer includes a self-attention model.

In some embodiments, the output network is further used to semantically understand the original image sample based on the output result of the feature extraction network, and output at least one of an entity prediction result, an entity relationship prediction result, and an attribute prediction result.

In the training act of the generator, the loss function of the generator is also related to the entity prediction result, the entity relationship prediction result and the attribute prediction result.

In some embodiments, the discriminator and the generator have a same model structure.

In some embodiments, the target model further includes a fine-tuning model; the method further includes:

obtaining a target sample set corresponding to a target training task;

training the fine-tuning model according to the target sample set.

In some embodiments, the fine-tuning model includes a multi-layer neural network layer.

The disclosure also provides a text image processing method, including: providing a target text and a target image to a target model generated using a model training method described above to obtain a target result.

The disclosure also provides a model training apparatus, including:

a sample acquisition module configured to acquire a sample set including a plurality of sample groups; each sample group includes an original image sample and original text samples for describing the original image sample; perform mask processing on the original image sample and the original text samples to generate a mask image sample and mask text samples of the sample group;

a training module configured to use the mask image sample and the mask text samples of the sample group to perform adversarial training on a generator and a discriminator to obtain a target model.

The generator includes a feature extraction network and an output network, the feature extraction network is used to perform feature extraction after information fusion of an input image and an input text of the generator; the output network is used to generate a restored image according to an output result of the feature extraction network.

The discriminator is used to judge whether the restored image is consistent with the original text samples.

The target model at least includes a feature extraction network in the trained generator.

The present disclosure also provides a computer device including a memory and a processor, the memory having stored thereon a computer program which, when executed by the processor, implements the method described above.

The present disclosure also provides a computer-readable storage medium having stored thereon a computer program which, when executed by a processor, implements the method described above.

BRIEF DESCRIPTION OF DRAWINGS

Accompanying drawings are provided to provide a further understanding of the disclosure and constitute a part of the specification and together with the following detailed description serve to explain the disclosure but does not constitute limitations on the present disclosure. In the drawings:

FIG. 2 is a schematic diagram of a model training method provided in other embodiments of the present disclosure.

FIG. 3 is a flowchart of an alternative implementation mode of act S20 provided in some embodiments of the present disclosure.

FIG. 4 is a schematic diagram of a generator training act provided in some embodiments of the present disclosure.

FIG. 5 is a schematic diagram of a discriminator training act provided in some embodiments of the present disclosure.

FIG. 6 is a schematic diagram of a generator training act provided in other embodiments of the present disclosure.

FIG. 7 is a schematic diagram of a feature extraction network provided in some embodiments of the present disclosure.

FIG. 10 is a schematic diagram of a model training method provided in other embodiments of the present disclosure.

FIG. 11 is a schematic diagram of a target image sample provided in an example.

DETAILED DESCRIPTION

The technical schemes in the embodiments of present disclosure will be described clearly and completely with reference to the drawings in the embodiments of present disclosure. The described embodiments are apparently only part of the embodiments of the present disclosure, rather than all of the embodiments. Based on the embodiments of the present disclosure, all other embodiments obtained by a person of ordinary skill in the art without paying any inventive effort are within the scope of protection of the present disclosure.

Terms used in the embodiments of the present disclosure are for a purpose of describing specific embodiments only, and are not intended to limit the embodiments of the present disclosure. Singular forms "a" and "the" used in the specification of the present disclosure and the appended claims are also intended to include the plural forms, unless the context clearly indicates another meaning. It should also be understood that the term "and/or" used herein refers to and contains any or all possible combinations of one or more associated listed items.

It should be understood that although the terms first, second, third, etc., may be used in embodiments of the present disclosure to describe various information, such information should not be limited to such terms. These terms are only used to distinguish the same type of information from each other. Depending on the context, the word "if" as used herein can be interpreted as "when" or "while" or "in response to determination".

Figure 1A:
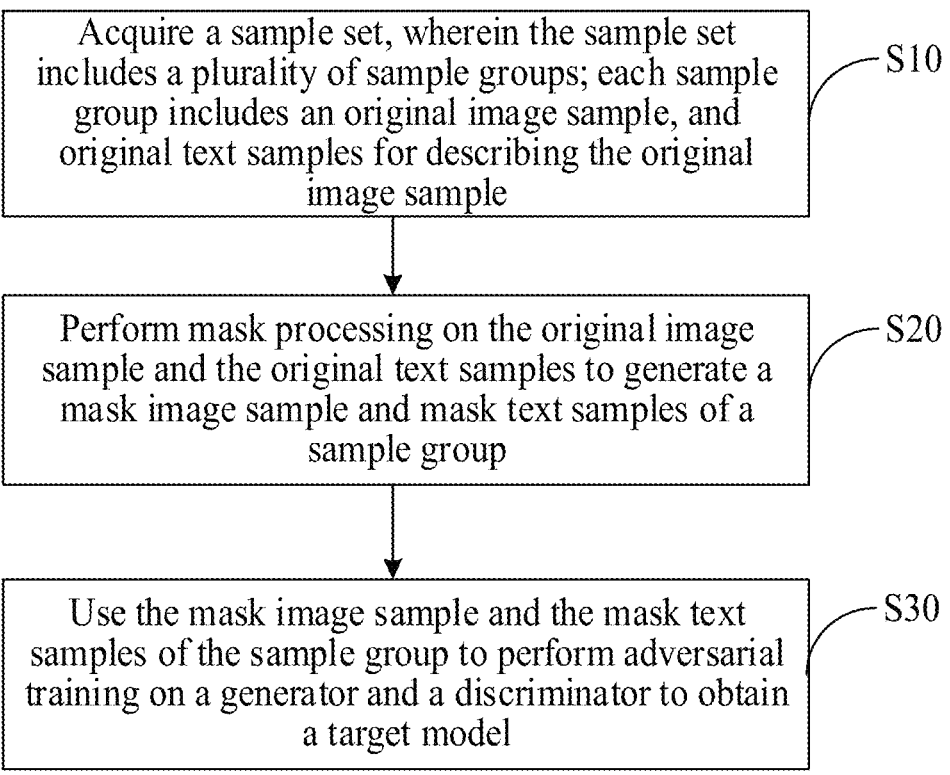
FIG. 1A is a schematic diagram of a model training method provided in some embodiments of the present disclosure.

FIG. 1A is a schematic diagram of a model training method provided in some embodiments of the present disclosure, and the model training method is used for generating a target model. As shown in FIG. 1A, the model training method includes the following acts S10 to S20.

S10 includes: acquiring a sample set, wherein the sample set includes a plurality of sample groups; each sample group includes an original image sample, and original text samples for describing the original image sample.

Figure 1B:
FIG. 1B is a schematic diagram of an original image sample provided in an example.

FIG. 1B is a schematic diagram of an original image sample provided in an example. The original image sample shown in FIG. 1B shows a white Infiniti car and a building with the white Infiniti car parked in front of the building. The original text samples corresponding to the original image sample can be "a white Infiniti car is parked in front of a building".

S20 includes: performing mask processing on the original image sample and the original text samples to generate a mask image sample and mask text samples of a sample group.

The mask processing performed on the original image sample may include adding noise (the noise may be random noise) to a partial region of the original image sample. For example, there is an image of at least one entity in the original image sample, and the above-mentioned "partial region" refers to a region where a certain entity is located in the original image sample. Among them, an "entity" refers to a distinguishable and independent object, which can be captured by a camera to obtain an image. For example, a certain person, a certain vehicle, a certain plant, a certain building and so on.

For example, the original image sample shows a white Infiniti car and a building, and the white Infiniti car is parked in front of the building; in this case, the mask processing performed on the original image sample can specifically include adding noise to an region where the vehicle is located in the original image sample.

The mask processing performed on the original text samples may include masking one or more lexical elements (token) in the original text samples (replacing the lexical elements with [mask]). For example, the original text samples can be "a white Infiniti car is parked in front of a building", and the mask processing on the original text samples can be: keying out the lexical element "building", and replacing the original lexical element with the [mask] mark.

It should be noted that when the mask processing is performed on the original image sample and the original text samples, the region of the original image sample to which the noise is added and the lexical element keyed out from the original text samples are random, and the two can match or not match. For example, in the above example, noise is added to the vehicle region in the original image sample, and in the original text samples, the lexical element "car" can be keyed out, or another lexical element "building" can be keyed out, or other lexical element can be keyed out.

S30 includes: using the mask image sample and the mask text samples of the sample group to perform adversarial training on a generator and a discriminator to obtain a target model.

The generator includes a feature extraction network and an output network, the feature extraction network is used to perform feature extraction after information fusion of an input image and an input text of the generator; the output network is used to generate a restored image according to an output result of the feature extraction network. The target model at least includes a feature extraction network in the trained generator.

The input image of the generator is the image input to the generator, and the input text is the text input to the generator. In the training process, the input image of the generator is the mask image sample; the input text of the generator is the mask text sample. In the application process of the target model, the input image is a target image provided to the target model, and the input sample is the target text provided to the target model.

The information fusion here can mean that the vector of the input image and the vector of the input text are fused to get a fusion vector. For example, if the vector of the input image includes m n-dimensional vectors and the vector of the input text includes p n-dimensional vectors, the fusion vector is (m+p) n-dimensional vectors formed by splicing the m n-dimensional vectors and the p n-dimensional vectors.

In the present disclosure, the discriminator is used to judge whether the restored image is consistent with the original text samples. It should be noted that whether the restored image is consistent with the original text samples means whether the content expressed by the restored image is consistent with the content expressed by the original text samples.

In the embodiments of the present disclosure, the adversarial training process performed on the generator and the discriminator includes: a generator training act and a discriminator training act; by alternating the generator training act and the discriminator generating act for a plurality of times, the ability of the generator to restore an image is continuously improved, and the discriminator's ability to discriminate is improved.

In the embodiments of the present disclosure, the ability of the generator to restore an image can be improved through the adversarial training of the generator and the discriminator, and the feature extraction network in the generator performs feature extraction based on the fusion information of the input image and the input text, so that the trained feature extraction network can more accurately obtain the true meaning of the input image and the input text. Therefore, as the target model, the trained feature extraction network can provide more accurate features for downstream tasks (for example, visual question answering tasks), so that the downstream tasks can obtain more accurate processing results.

FIG. 2 is a schematic diagram of a model training method provided in other embodiments of the present disclosure. As shown in FIG. 2, the model training method includes, in addition to acts S10 to S30 above, act S11: acquiring a priori knowledge of the original text samples, the priori knowledge at least includes entities in the original text samples, relationships between the entities, and attributes of the entities. Among them, the priori knowledge can be obtained according to knowledge map.

The entity relationship is a lexical element used to indicate the relationship between entities (for example, positional relationship, logical relationship, etc.), and the entity attribute is a lexical element used to indicate the attributes of entities (for example, characteristics such as color, category, shape, size of entities, etc.). For example, for the original text samples "a white Infiniti car is parked in front of a building", "car" and "building" represent entities; "Infiniti" and "white" indicate entity attributes; "in front of" indicates an entity relationship.

FIG. 3 is a flowchart of an alternative implementation mode of act S20 provided in some embodiments of the present disclosure. As shown in FIG. 3, act S20 may specifically include S20a to S20c.

S20a includes: performing target detection on the original image sample to determine a target entity region in the original image sample.

Herein, in act S20a, a commonly used target detection algorithm (for example, YOLO algorithm, RCNN algorithm, etc.) can be used to perform target detection on the original image sample.

S20b includes: performing mask processing on the target entity region of the original image sample according to the detection result of the original image sample.

Herein, the mask processing performed on the original image sample may include adding noise (the noise may be random noise) to a partial region of the original image sample.

S20c includes: performing mask processing on the original text samples according to the priori knowledge of the original text samples.

Herein, the mask processing performed on the original text samples may include masking one or more lexical elements in the original text samples (replacing the lexical elements with [mask]).

Herein, the order of acts S20b and S20c is not limited, and it may be that act S20b comes first, or act S20c comes first, or acts S20b and S20c may be carried out at the same time.

In some embodiments, the adversarial training includes repeating a generator training act and a discriminator training act alternately until a preset training condition is reached. For example, the preset training condition is that the number of training times reaches a predetermined number. Repeating the generator training act and the discriminator training act alternately refers to sequentially performing the generator training act, the discriminator training act, the generator training act, the discriminator training act, the generator training act, . . . and so on.

FIG. 4 is a schematic diagram of a generator training act provided in some embodiments of the present disclosure. As shown in FIG. 4, the generator training act include following acts.

S211 includes: providing the mask image sample and the mask text samples to the generator to obtain a restored image.

S212 includes: providing the restored image and the corresponding original text samples to the discriminator, so that the discriminator judges whether the restored image corresponds to the original text samples and outputs a first discrimination result. Herein, the discriminator is used for judging whether the received image is consistent with the text, and when the discriminator judges that the received image is consistent with the sample, it can output a judgment result of "1"; when the discriminator judges that the received image is inconsistent with the sample, it can output a judgment result of "0".

S213 includes: adjusting parameters of the generator according to a loss function of the generator, wherein the loss function of the generator is at least related to an output of the discriminator.

In act S213, the loss function of the generator is reduced by adjusting the parameters of the generator, i.e., so that the value of the loss function of the generator is reduced with respect to the previous generator training act, or the value of the loss function as a whole is trending down over a plurality of generator training acts.

In some embodiments, the output network in the generator is further used to semantically understand the original image sample based on the output result of the feature extraction network, and output at least one of an entity prediction result, an entity relationship prediction result, and an attribute prediction result. Herein, in the training act of the generator, the loss function of the generator is also related to the entity prediction result, the entity relationship prediction result and the attribute prediction result, so that the text understanding ability of the generator can be improved. Herein, the loss function of the generator can be regarded as a superposition of multiple loss terms, and the first loss term is a loss term related to the output result of the discriminator; the second loss item is a loss item related to the entity prediction result; the third loss item is a loss item related to the entity relationship prediction result; and the fourth loss item is a loss item related to the attribute prediction result.

FIG. 5 is a schematic diagram of a discriminator training act provided in some embodiments of the present disclosure. As shown in FIG. 5, the discriminator training act includes the following acts S221 to S222.

S221 includes: providing the mask image sample and the mask text samples to a parameter-adjusted generator to output a new restored image.

S222 includes: providing the new restored image and the original image sample corresponding to the mask image sample to the discriminator, and adjusting parameters of the discriminator according to a loss function of the discriminator, so that the discriminator can discriminate whether the received image and the text match or not.

In act S222, the loss function of the discriminator is reduced by adjusting the parameters of the discriminator, i.e., so that the value of the loss function of the discriminator is reduced relative to that of the previous discriminator training act, or the value of the loss function as a whole is trending down over a plurality of discriminator training acts.

Herein, the n-th discriminator training act and the n-th generator training act are taken as one round of training acts, the mask image samples supplied to the generator can be the same and the mask text samples supplied to the generator can be the same in the discriminator training act and the generator training act in the same round of training process. However, the mask image samples utilized in different rounds of the training process can be different and the mask text samples can be different.

In the training process, the loss function of the generator is based on the output of the discriminator, and the training of the discriminator needs the output result of the generator, this way is called "adversarial". This training method makes two networks that are "adversarial" with each other compete and improve continuously based on the increasingly better results of the other network in each iteration, so as to get increasingly more optimal parameters in training, so that the generator can achieve increasingly better image restoration ability and the discriminator can achieve increasingly better discrimination ability.

FIG. 6 is a schematic diagram of a generator training act provided in other embodiments of the present disclosure. As shown in FIG. 6, in other embodiments, the training act of the generator includes, in addition to the above acts S211 to S223, act S2120: providing the restored image and corresponding replacement text samples to the discriminator so that the discriminator judges whether the restored image corresponds to the replacement text samples and outputs a second discrimination result. Herein, the replacement text samples are obtained by replacing at least one of an entity, an entity relationship and an entity attribute in the original text samples. Herein, the entity, entity relationship and entity attribute are determined according to the priori knowledge above.

Herein, the loss function of the generator is not only related to the first discrimination result obtained by the discriminator based on the restored image and the original text samples, but also related to the second discrimination result obtained by the discriminator based on the restored image and the restored text samples, so that the parameters of the generator can be further optimized when the parameters of the generator are adjusted according to the loss function of the generator.

In one example, the entity in the original text samples can be replaced to obtain the replacement sample text, for example, the replacement sample text is "a white Infiniti aircraft is parked in front of a building" and "a white Infiniti car is parked in front of a door". In another example, the entity relationship in the original text samples can be replaced, for example, the replacement sample text is "a white Infiniti car is parked behind a building". In another example, the entity attribute in the original text samples can be replaced, for example, the replacement sample text is "a black Infiniti car is parked in front of a building".

In some embodiments, the difference between the number of the replacement text samples and the number of the original text samples is less than or equal to a preset threshold. For example, the preset threshold is 10%, or 5%, or 2% of the total number of the original text samples. For example, the number of the replacement text samples is equal to the number of the original text samples.

It should be noted that the order of the above acts S212 and S2120 is not limited, and it may be that act S212 comes first, or act S2120 comes first.

FIG. 7 is a schematic diagram of a feature extraction network provided in some embodiments of the present disclosure. As shown in FIG. 7, the feature extraction network includes a first vectorization layer 1, a second vectorization layer 2, a fusion layer 3, and a feature extraction layer 4.

The first vectorization layer 1 is used for vectorizing the input image of the generator to obtain an image vector. In one example, the first vectorization layer 1 may be a CNN network or may be of another structure. The second vectorization layer 2 is used for vectorizing the input text of the generator to obtain a text vector of the input text. In one example, the second vectorization layer 2 may employ a word2dec structure or a bert structure or other structure that can vectorize text.

It should be understood that in the training process, the input image of the generator is the mask image sample, and the input text of the generator is the mask text samples. In the application process, the input image of the generator is a target image to be processed, and the input text of the generator is a target text to be processed.

The fusion layer 3 is used for fusing the image vector and the text vector to obtain a fusion vector. The fusion of the image vector and the text vector by the fusion layer 3 can be regarded as vector splice. For example, if the image vector is m n-dimensional vectors and the text vector is p n-dimensional vectors, the fusion vector is (m+p) n-dimensional vectors formed by splicing of the m n-dimensional vectors and the p n-dimensional vectors.

Figure 8:
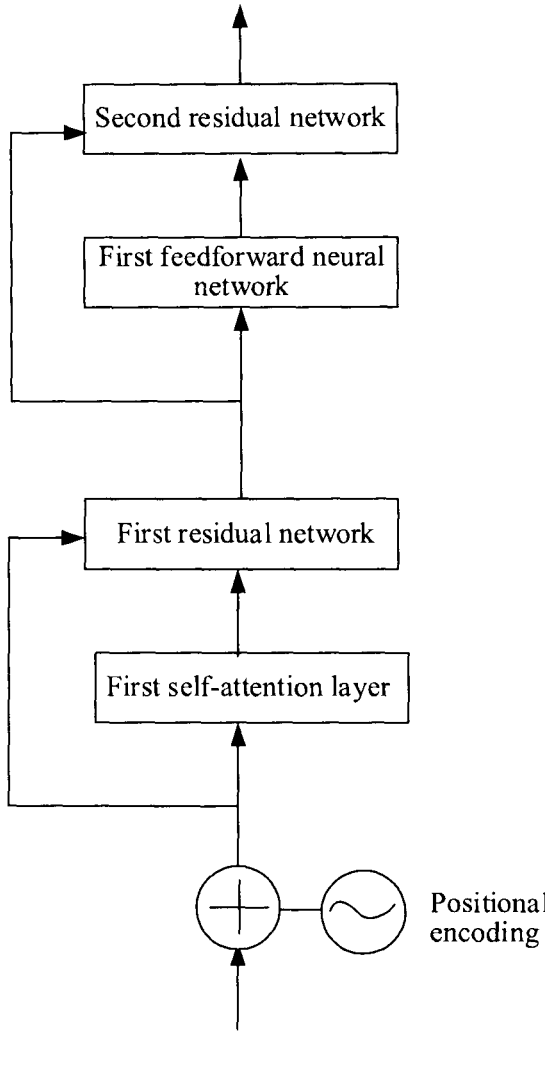
FIG. 8 is a schematic diagram of a self-attention model provided in some embodiments of the present disclosure.

The feature extraction layer 4 is used for performing feature extraction on the fusion vector. In some embodiments, the feature extraction layer 4 may include a self-attention model. FIG. 8 is a schematic diagram of a self-attention model provided in some embodiments of the present disclosure. As shown in FIG. 8, the self-attention model includes a self-attention layer, a first residual network, a first feedforward neural network layer, and a second residual network. The input of the first residual network includes the input of the self-attention layer and the output of the self-attention layer. The input of the first feedforward neural network layer includes the output of the first residual network layer; the input of the second residual network layer includes the output of the first feedforward neural network layer and the output of the first residual network.

Herein, the specific calculation process of the first residual network layer and the second residual network layer can include superposition and normalization (Add & Norm).

In some embodiments, the input of the self-attention layer may include the input of the self-attention model (i.e., the fusion vector described above). In addition, positional encoding of lexical elements in the input text of the generator may be determined, and then the positional encoding features and the input of the self-attention model are superimposed and inputted to the self-attention layer.

Figure 9:
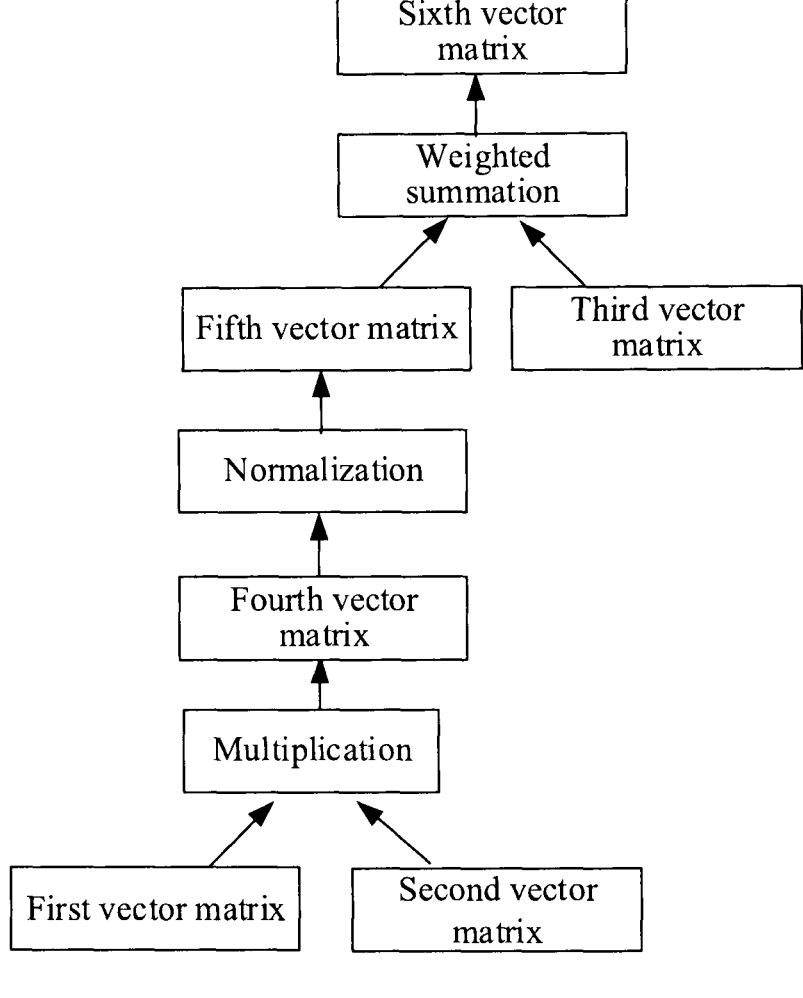
FIG. 9 is a schematic diagram of the calculation process of a self-attention layer provided in some embodiments of the present disclosure.

FIG. 9 is a schematic diagram of the calculation process of a self-attention layer provided in some embodiments of the present disclosure. As shown in FIG. 9, the self-attention layer is specifically configured to perform the following operations from a calculation process perspective.

Performing a multiplication operation on an input vector and a training matrix to obtain a first vector matrix, a second vector matrix and a third vector matrix; wherein a matrix multiplication can also involve multiplying with the transpose of a matrix, which can be adjusted according to the actual situation, and is not limited here. It should be noted that the input vector of the self-attention layer is the output of the fusion layer.

Performing a multiplication operation between the first vector matrix and the second vector to obtain a fourth vector matrix.

Normalizing the fourth vector matrix to obtain a fifth vector matrix.

Performing weighted summation of the third vector matrix based on the fifth vector matrix to obtain a sixth vector matrix.

In some embodiments, a scaling transformation may also be performed prior to the normalization of the fourth vector matrix, i.e., the fourth vector matrix is divided by $\sqrt{d_k}$, where $d_k$ is the dimension of the second vector matrix.

In some embodiments, the self-attention layer may be a Multi-head-attention layer.

In some embodiments, the discriminator and the generator have a same model structure, both of which vectorize and fuse the input image and the input text, and then perform feature extraction on the fused vector. In the discriminator, a full connection layer may also be included to generate a binary discrimination result.

In some embodiments, the target model includes, in addition to the feature extraction network in the adversarial trained generator, a fine-tuning model located behind the feature extraction network. FIG. 10 is a schematic diagram of a model training method provided in other embodiments of the present disclosure. As shown in FIG. 10, the model training method further includes following acts.

S40 includes: obtaining a target sample set corresponding to a target training task.

S50 includes: training the fine-tuning model according to the target sample set.

In some embodiments, the target training task described above may be a visual question answering task, in which case the output result of the feature extraction network is provided to the fine-tuning model in the adversarial trained generator. In one example, the fine-tuning model includes a Multi-Layer Perceptron (MLP) layer.

The target sample set may include a plurality of target image samples and a plurality of target text samples. FIG. 11 is a schematic diagram of a target image sample provided in an example. The target text samples corresponding to the target image sample may be multiple, the multiple target text samples are used for correctly describing the target image sample or incorrectly describing the target image sample, for example, the target text samples corresponding to the target image sample shown in FIG. 11 may be "her eyes are black", "her eyes are blue" and the like.

Act S50 can specifically include: inputting a target input sample into the target model, so that the target model vectorizes the target image sample and the target text samples in the target input sample, then fuses the image vector of the target image sample and the text vector of the target text samples, and performs feature extraction on the fusion vector to obtain an intermediate feature vector; after that, inputting the intermediate feature vector to the fine-tuning model, and at least fine-tuning training the above fine-tuning model according to the difference between the output result of the fine-tuning model and the target output sample. The fine-tuning model is used to output the matching degree between the target text samples and the target image sample. In act S50, only the fine-tuning model can be trained; the feature extraction network and the fine-tuning model can also be fine-tuning trained at the same time.

In the above embodiment, the adversarial training of the generator and the discriminator can be regarded as a pre-training process, through which the generator can better understand the image and the text and form a general model with better generalization. After the trained generator is obtained, the fine-tuning training process can be constructed according to specific application scenarios. The training model for fine-tuning training can be achieved by adding a fine-tuning model based on the feature extraction network in the generator that has undergone adversarial training, so as to be trained as a whole target model, to more accurately adapt to the needs of specific scenes. The pre-training+fine-tuning training approach is an application of transfer learning with good scalability. Due to the strong generalization ability of a pre-trained model, when training the model for new application scenarios, the parameters of the trained pre-trained model can be utilized for initialization, and fine-tuned for the target model to get better training results.

The embodiments of the present disclosure also provide a text image processing method, which includes the following acts.

S100 includes: providing a target text and a target image to a target model to obtain a target result. Herein, the target model is generated by the model training method in the above embodiments.

For example, in one example, the target model includes a feature extraction network in a trained generator and a fine-tuning model. The feature extraction network vectorizes the target image and the target text to get the image vector of the target image and the text vector of the target text, and fuses the image vector and the text vector to get a fusion vector, and then perform feature extractions on the fusion vector. The fine-tuning model outputs the matching degree between the target image and the target text according to the features extracted by the feature extraction network.

In an example, the target model may be used for performing a visual question answering, for example, when performing a visual question answering, the target text is declarative sentence text that matches the question of the visual question answering, and can correctly describe or incorrectly describe the target image, and the target model may judge whether the target text and the target image match, and determine the matching degree between the target text and the target image.

For example, taking the image in FIG. 11 as the target image, the question of the visual question answering is "what color are her eyes?" The corresponding target text can be "Her eyes are black", "Her eyes are white", "Her eyes are blue" and so on. Herein, the target text with the highest matching degree with the target image is the answer to the question.

Figure 12:
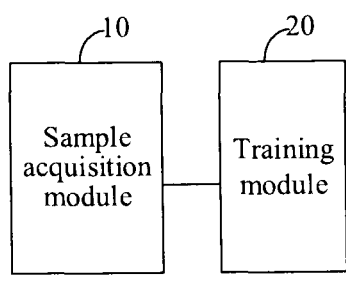
FIG. 12 is a schematic diagram of a model training apparatus provided in some embodiments of the present disclosure.

FIG. 12 is a schematic diagram of a model training apparatus provided in some embodiments of the present disclosure. As shown in FIG. 12, the model training apparatus includes a sample acquisition module 10 and a training module 20.

Herein, the sample acquisition module 10 is configured to acquire a sample set including a plurality of sample groups; each sample group includes an original image sample and original text samples for describing the original image sample; perform mask processing on the original image sample and the original text samples to generate a mask image sample and mask text samples of the sample group.

The training module 20 is configured to use the mask image sample and the mask text samples of the sample group to perform adversarial training on a generator and a discriminator to obtain a target model.

Herein, the generator includes a feature extraction network and an output network, the feature extraction network is used to perform feature extraction after information fusion of an input image and an input text of the generator; the output network is used to generate a restored image according to an output result of the feature extraction network. The discriminator is used to judge whether the restored image is consistent with the original text samples. The target model at least includes a feature extraction network in the trained generator.

Figure 13:
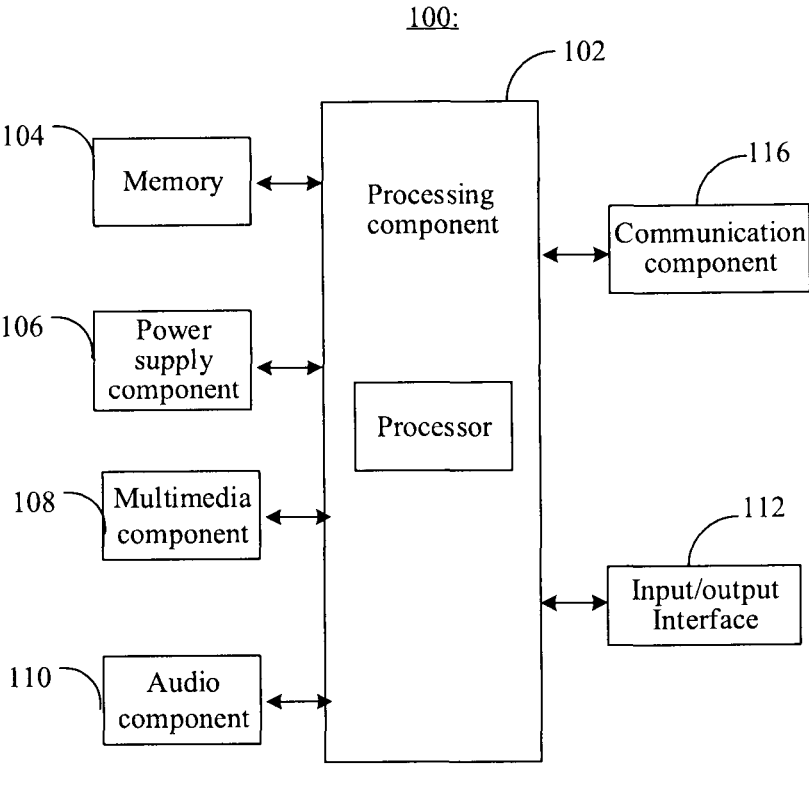
FIG. 13 is a schematic diagram of a computer device provided in some embodiments of the present disclosure.

FIG. 13 is a schematic diagram of a computer device provided in some embodiments of the present disclosure, wherein, for example, the computer device 100 may be a terminal, such as a mobile phone, a computer, a digital broadcasting terminal, a messaging device, a game console, a tablet device, a medical device, a fitness device, a personal digital assistant, etc.; it can also be a server.

Referring to FIG. 13, the computer device 100 may include one or more of the following components: a processing component 102, a memory 104, a power supply component 106, a multimedia component 108, an audio component 110, an input/output (I/O) Interface 112, and a communication component 116.

The processing component 102 generally controls the overall operation of the computer device 100, such as operations associated with display, telephone calls, data communication, camera operations and recording operations. The processing component 102 may include one or more processors 120 to execute instructions to complete all or part of the acts of the method described above. Further, the processing component 102 may include one or more modules to facilitate interaction between the processing component 102 and other components. For example, the processing component 102 may include a multimedia module to facilitate interaction between the multimedia component 108 and the processing component 102.

The memory 104 is configured to store various types of data to support operation at the computer device 100. Examples of such data include instructions for any application or method operating on the computer device 100, contact data, phone book data, messages, pictures, videos and the like. The memory 104 may be implemented by any type of volatile or nonvolatile storage device or a combination thereof, such as static random access memory (SRAM), electrically erasable programmable read-only memory (EE-PROM), erasable programmable read-only memory (EPROM), programmable read-only memory (PROM), read-only memory (ROM), magnetic memory, flash memory, magnetic disk or optical disk.

The power supply component 106 provides power to various components of the computer device 100. The power supply component 106 may include a power management system, one or more power sources, and other components associated with generating managing and distributing power for the computer device 100.

The multimedia component 108 includes a screen that provides an output interface between the computer device 100 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, slide, and gestures on the touch panel. The touch sensor may not only sense a boundary of a touch or slide action, but also detect a duration and pressure associated with the touch or slide operation. In some embodiments, the multimedia component 108 includes a front camera and/or a rear camera. When the computer device 100 is in an operation mode, such as a shooting mode or a video mode, the front camera and/or the rear camera may receive external multimedia data. Each front camera and rear camera can be a fixed optical lens system or have a focal length and optical zoom capability.

The audio component 110 is configured to output and/or input audio signals. For example, the audio component 110 includes a microphone (MIC) configured to receive an external audio signal when the computer device 100 is in an operating mode, such as a call mode, a recording mode and a speech recognition mode. The received audio signal may be further stored in the memory 104 or transmitted via the communication component 116. In some embodiments, the audio component 110 also includes a speaker for outputting an audio signal.

The I/O Interface 112 provides an interface between the processing component 102 and peripheral interface modules which may be keyboards, click wheels buttons and the like. These buttons may include, but are not limited to, a home button, a volume button, a start button, and a lock button.

The communication component 116 is configured to facilitate communication between the computer device 100 and other devices in a wired or wireless manner. The computer device 100 may access a wireless network based on a communication standard, such as WiFi, 2G or 3G, 4G LTE, 5G NR, or a combination thereof. In an exemplary embodiment, the communication component 116 receives broadcast signals or broadcast-related information from an external broadcast management system via a broadcast channel. In an exemplary embodiment, the communication component 116 also includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the computer device 100 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the methods described above.

Embodiments of the present disclosure also provide a computer-readable storage medium having stored thereon a computer program which, when executed by a processor, implements the instruction recognition method or the training method of a natural language model in the above embodiments. For example, the computer-readable storage medium may include a storage unit of a tablet computer, a hard disk of a personal computer, random access memory (RAM), read-only memory (ROM), erasable programmable read-only memory (EPROM), optical disk read-only memory (CD-ROM), flash memory, or any combination of the above storage medium, and may be other suitable storage medium.

It should be understood that the present disclosure is not limited to precise structures already described above and shown in the drawings, and various modifications and changes may be made without departing from its scope. The scope of the present disclosure is limited only by the appended claims.

It should be noted that relational terms such as first and second are used herein only to distinguish one entity or operation from another and do not necessarily require or imply any such actual relationship or order between these entities or operations. The terms "include", "contain" or any other variations thereof are intended to cover a non-exclusive inclusion, such that a process, method, article, or device that includes a series of elements includes not only those elements but also other elements which are not expressly listed, or further includes elements inherent to such a process, method, article, or device. An element defined by a statement "include one . . . " does not exclude presence of additional identical elements in the process, method, article or device that includes the element, without more limitations.

The method and apparatus provided by the embodiments of the present disclosure are described in detail above and the principle and implementation mode of the present disclosure are described by applying specific examples herein. The description of the above embodiments is only used to help understand the method and its core idea of the present disclosure; at the same time, to those of ordinary skill in the art, according to the idea of the present disclosure, there will be changes in the specific implementation mode and the scope of application. In summary, the contents of this specification should not be understood as limitations on the present disclosure.

The invention claimed is:

1. A model training method, comprising:

acquiring a sample set comprising a plurality of sample groups; wherein each sample group comprises an original image sample and original text samples for describing the original image sample;

performing mask processing on the original image sample and the original text samples to generate a mask image sample and mask text samples of the sample group; and using the mask image sample and the mask text samples of the sample group to perform adversarial training on a generator and a discriminator to obtain a target model; wherein the generator comprises a feature extraction network and an output network, the feature extraction network is used to perform feature extraction after information fusion of an input image and an input text of the generator; the output network is used to generate a restored image according to an output result of the feature extraction network;

the discriminator is used to judge whether the restored image is consistent with the original text samples; and the target model at least comprises a feature extraction network in the trained generator;

wherein the adversarial training comprises alternately repeated generator training act and discriminator training act;

the generator training act comprises:

providing the mask image sample and the mask text samples to the generator to obtain a restored image;

providing the restored image and the corresponding original text samples to the discriminator for the discriminator to judge whether the restored image corresponds to the original text samples and outputting a first discrimination result; and adjusting parameters of the generator according to a loss function of the generator, wherein the loss function of the generator is at least related to an output of the discriminator; and the discriminator training act comprises:

providing the mask image sample and the mask text samples to a parameter-adjusted generator to output a new restored image; and providing the new restored image and the original image sample corresponding to the mask image sample to the discriminator, and adjusting parameters of the discriminator according to a loss function of the discriminator, so that the discriminator can discriminate whether a received image and text match or not.

2. The method according to claim 1, wherein the generator training act further comprises:

providing the restored image and corresponding replacement text samples to the discriminator so that the discriminator judges whether the restored image corresponds to the replacement text samples and outputs a second discrimination result;

wherein the replacement text samples are obtained by replacing at least one of an entity, an entity relationship and an entity attribute in the original text samples.

3. The method according to claim 2, wherein the difference between the number of the replacement text samples and the number of the original text samples is less than or equal to a preset threshold.

4. The method according to claim 2, wherein the method further comprises: acquiring a priori knowledge of the original text samples, the priori knowledge at least comprises: entities in the original text samples, relationships between the entities, attributes of the entities; and performing mask processing on the original image sample and the original text samples, comprising:

performing target detection on the original image sample to determine a target entity region in the original image sample;

performing mask processing on the target entity region of the original image sample according to the detection result of the original image sample; and performing mask processing on the original text samples according to the priori knowledge of the original text samples.

5. The method according to claim 2, wherein the feature extraction network comprises:

a first vectorization layer used for vectorizing the input image of the generator to obtain an image vector;

a second vectorization layer used for vectorizing the input text of the generator to obtain a text vector of the input text;

a fusion layer for fusing the image vector and the text vector to obtain a fusion vector; and a feature extraction layer for performing feature extraction on the fusion vector.

6. The method according to claim 2, wherein the discriminator and the generator have a same model structure.

7. The method according to claim 2, wherein the target model further comprises a fine-tuning model; the method further comprises:

obtaining a target sample set corresponding to a target training task; and training the fine-tuning model according to the target sample set.

8. The method according to claim 1, wherein the method further comprises: acquiring a priori knowledge of the original text samples, the priori knowledge at least comprises: entities in the original text samples, relationships between the entities, attributes of the entities; and performing mask processing on the original image sample and the original text samples, comprising:

performing target detection on the original image sample to determine a target entity region in the original image sample;

performing mask processing on the target entity region of the original image sample according to the detection result of the original image sample; and performing mask processing on the original text samples according to the priori knowledge of the original text samples.

9. The method according to claim 1, wherein the feature extraction network comprises:

a first vectorization layer used for vectorizing the input image of the generator to obtain an image vector;

a second vectorization layer used for vectorizing the input text of the generator to obtain a text vector of the input text;

a fusion layer for fusing the image vector and the text vector to obtain a fusion vector; and a feature extraction layer for performing feature extraction on the fusion vector.

10. The method according to claim 9, wherein the feature extraction layer comprises a self-attention model.

11. The method according to claim 1, wherein the output network is further used to semantically understand the original image sample based on the output result of the feature extraction network, and output at least one of an entity prediction result, an entity relationship prediction result, and an attribute prediction result;

wherein in the training act of the generator, the loss function of the generator is also related to the entity prediction result, the entity relationship prediction result and the attribute prediction result.

12. The method according to claim 1, wherein the discriminator and the generator have a same model structure.

13. The method according to claim 1, wherein the target model further comprises a fine-tuning model; the method further comprises:

obtaining a target sample set corresponding to a target training task; and training the fine-tuning model according to the target sample set.

14. The method according to claim 13, wherein the fine-tuning model comprises a multi-layer neural network layer.

15. A text image processing method, comprising:

providing a target text and a target image to a target model generated using the model training method according to claim 1 to obtain a target result.

16. A computer device comprising a memory and a processor, the memory having stored thereon a computer program which, when executed by the processor, implements the method according to claim 1.

17. A non-transitory computer readable storage medium comprising program instructions which, when executed by a processor, cause the processor to execute the method according to claim 1.

18. A computer device comprising a memory and a processor, the memory having stored thereon a computer program which, when executed by the processor, implements the method according to claim 2.

19. A model training apparatus, comprising:

a processor; and a non-transitory computer readable storage medium storing instructions that, when executed by the processor, cause the processor to perform steps comprising:

acquiring a sample set comprising a plurality of sample groups; wherein each sample group comprises an original image sample and original text samples for describing the original image sample;

performing mask processing on the original image sample and the original text samples to generate a mask image sample and mask text samples of the sample group; and using the mask image sample and the mask text samples of the sample group to perform adversarial training on a generator and a discriminator to obtain a target model;

wherein the generator comprises a feature extraction network and an output network, the feature extraction network is used to perform feature extraction after information fusion of an input image and an input text of the generator; the output network is used to generate a restored image according to an output result of the feature extraction network;

the discriminator is used to judge whether the restored image is consistent with the original text samples;

the target model at least comprises a feature extraction network in the trained generator;

the adversarial training comprises alternately repeated generator training act and discriminator training act;

the generator training act comprises:

providing the mask image sample and the mask text samples to the generator to obtain a restored image;

providing the restored image and the corresponding original text samples to the discriminator for the discriminator to judge whether the restored image corresponds to the original text samples and outputting a first discrimination result; and adjusting parameters of the generator according to a loss function of the generator, wherein the loss function of the generator is at least related to an output of the discriminator; and the discriminator training act comprises:

providing the mask image sample and the mask text samples to a parameter-adjusted generator to output a new restored image; and providing the new restored image and the original image sample corresponding to the mask image sample to the discriminator, and adjusting parameters of the discriminator according to a loss function of the discriminator, so that the discriminator can discriminate whether a received image and text match or not.

* * * * *